(12) United States Patent
Wojciechowski et al.

(10) Patent No.: US 7,001,125 B2
(45) Date of Patent: Feb. 21, 2006

(54) SELF-ATTACHING FEMALE FASTENER ELEMENT, SEALED FASTENER AND PANEL ASSEMBLY AND METHOD OF FORMING SAME

(75) Inventors: Stanley E. Wojciechowski, Canton, MI (US); John M. Parker, Ann Arbor, MI (US)

(73) Assignee: Whitesell International Corporation, Taylor, MI (US)

( * ) Notice: Subject to any disclaimer, the term of this patent is extended or adjusted under 35 U.S.C. 154(b) by 0 days.

(21) Appl. No.: 10/863,852

(22) Filed: Jun. 8, 2004

(65) Prior Publication Data

US 2004/0234357 A1   Nov. 25, 2004

Related U.S. Application Data

(63) Continuation of application No. 10/234,692, filed on Sep. 4, 2002, now abandoned.

(51) Int. Cl.
*F16B 39/282* (2006.01)

(52) U.S. Cl. ................ 411/180; 411/181; 411/187; 411/188

(58) Field of Classification Search ............. 411/172, 411/173, 176, 180, 181, 183, 187, 188, 427; D8/397
See application file for complete search history.

(56) References Cited

U.S. PATENT DOCUMENTS

| | | | |
|---|---|---|---|
| 1,112,525 A | 10/1914 | Darling | |
| 1,919,552 A | 7/1933 | Hasselquist | |
| 3,213,914 A | 10/1965 | Baumle et al. | 151/41.72 |
| 3,253,631 A | 5/1966 | Reusser | 151/41.73 |
| 3,282,315 A | 11/1966 | Zahodiakin | 151/41.73 |
| 3,736,969 A | 6/1973 | Wärn et al. | 151/41.73 |
| 3,810,291 A | 5/1974 | Ladouceur | 29/243.52 |
| 3,910,331 A | 10/1975 | Randall | 151/41.72 |
| 4,389,766 A | 6/1983 | Capuano | 29/432.2 |
| 4,432,681 A | 2/1984 | Capuano | 411/180 |
| 4,470,736 A * | 9/1984 | Tasseron | 411/404 |
| 4,543,023 A | 9/1985 | Capuano | 411/180 |
| 4,627,776 A | 12/1986 | Pamer et al. | 411/179 |
| 4,637,766 A | 1/1987 | Milliser | 411/180 |
| 4,708,556 A | 11/1987 | Pamer et al. | 411/179 |
| 4,893,976 A | 1/1990 | Milliser et al. | 411/180 |
| 5,251,370 A | 10/1993 | Muller et al. | 29/512 |
| 5,302,066 A | 4/1994 | Bieschke et al. | 411/181 |
| 5,335,411 A | 8/1994 | Muller et al. | 29/512 |
| 5,340,251 A | 8/1994 | Takahashi et al. | 411/179 |
| 5,423,645 A | 6/1995 | Muller et al. | 411/181 |
| 5,509,766 A | 4/1996 | Leuschner | 411/187 |
| 5,531,552 A | 7/1996 | Takahashi et al. | 411/179 |
| 5,549,430 A | 8/1996 | Takahashi et al. | 411/179 |

(Continued)

OTHER PUBLICATIONS

International Search Report mailed Jun. 20, 2003 for PCT/US03/08424.

*Primary Examiner*—Gary S. Hartmann
(74) *Attorney, Agent, or Firm*—Howard & Howard

(57) ABSTRACT

A self-attaching female fastener such as a pierce nut having an annular pilot, an annular flange surrounding the pilot and an annular groove in the flange bearing surface surrounding the pilot, wherein the bottom wall of the groove includes wedge-shaped recesses dividing the groove bottom wall into segments having parallel sides defined by the adjacent wedge-shaped recesses and the inclined outer wall of the pilot is deformed radially during installation to entrap and compact panel metal in the groove forming a sealed secure installation having improved push-off and anti-rotation strength.

9 Claims, 3 Drawing Sheets

U.S. PATENT DOCUMENTS

| | | | | |
|---|---|---|---|---|
| 5,613,815 A | 3/1997 | Muller | | 411/181 |
| 5,782,594 A | 7/1998 | Muller | | 411/176 |
| 5,882,159 A | 3/1999 | Muller | | 411/179 |
| 6,004,087 A | 12/1999 | Muller | | 411/180 |
| 6,081,994 A | 7/2000 | Muller | | 29/798 |
| 6,125,524 A * | 10/2000 | Mueller | | 29/520 |
| D437,211 S * | 2/2001 | Pamer et al. | | D8/397 |
| D440,865 S * | 4/2001 | Pamer et al. | | D8/397 |
| 6,220,804 B1 | 4/2001 | Pamer et al. | | 411/180 |
| 6,257,814 B1 | 7/2001 | Muller | | 411/176 |
| 6,276,040 B1 | 8/2001 | Muller | | 29/432.2 |
| D448,659 S | 10/2001 | Pamer et al. | | D8/397 |
| D448,660 S * | 10/2001 | Pamer et al. | | D8/397 |
| 6,318,940 B1 * | 11/2001 | Mitts | | 411/188 |
| D454,057 S * | 3/2002 | Pamer et al. | | D8/397 |
| D454,484 S * | 3/2002 | Pamer et al. | | D8/397 |
| D457,054 S | 5/2002 | Pamer et al. | | D8/397 |
| 6,409,444 B1 | 6/2002 | Pamer et al. | | 411/180 |
| 6,543,979 B1 | 4/2003 | Iwatsuki | | 411/180 |
| 2001/0010789 A1 | 8/2001 | Pamer et al. | | 411/179 |
| 2002/0159858 A1 | 10/2002 | Ikami et al. | | 411/181 |
| 2002/0172573 A1 | 11/2002 | Pamer et al. | | 411/337 |
| 2002/0182032 A1 | 12/2002 | Anderson et al. | | 411/533 |
| 2003/0039530 A1 | 2/2003 | Ross et al. | | 411/181 |

* cited by examiner

SELF-ATTACHING FEMALE FASTENER ELEMENT, SEALED FASTENER AND PANEL ASSEMBLY AND METHOD OF FORMING SAME

RELATED APPLICATIONS

This application is a continuation application and claims priority to application Ser. No. 10/234,692 filed Sep. 4, 2002, now abandoned.

FIELD OF THE INVENTION

The present invention relates to self-attaching female fastener elements, particularly including pierce nuts, sealed fastener and panel assemblies and methods of forming a sealed female fastener and panel assembly.

BACKGROUND OF THE INVENTION

There are various types of self-attaching female fastener elements, including pierce nuts, which may be formed by cold heading. However, such female fastener elements generally do not form a sealed joint with a metal panel, particularly thin metal panels such as now used by the automotive and appliance industries. Further, pierce nuts formed by cold heading generally do not have sufficient torque resistance for many applications, such as oil pan nuts.

The prior art includes self-attaching female fasteners formed by cold heading including a central annular pilot portion having a bore extending through an annular end face of the pilot portion, an annular flange portion surrounding the pilot portion having a generally planar annular bearing face and an annular groove in the annular bearing face of the flange portion surrounding the pilot portion. During installation of the fastener to a panel, the pilot portion is received through an opening in the panel and a portion of the panel surrounding the opening is deformed into the annular groove. Where the self-attaching female fastener element is a pierce nut, the pilot portion projects above the bearing face of the flange portion and the end face of the pilot portion pierces an opening in the panel. The prior art also includes various anti-rotation means including recesses and protrusions in the bottom or side walls of the groove. However, such anti-rotation means are generally not suitable for thin metal panels and the pierce nuts generally do not form a sealed joint.

There is, therefore, a long felt need for a self-attaching female fastener element, particularly a pierce nut, which may be formed by cold header techniques having sufficient torque resistance particularly with thin metal panels and which forms a sealed joint with the panel for applications requiring a sealed joint including, for example, oil pan nuts and the like. The self-attaching female fastener element, female fastener element and panel assembly and method of forming a sealed joint of this invention achieves these objects in a female fastener element which may be formed by conventional cold header techniques.

SUMMARY OF THE INVENTION

As set forth above, the self-attaching female fastener element of this invention may be utilized as a self-piercing female fastener to form a sealed joint between the female fastener and a metal panel for applications requiring a sealed joint including, for example, an oil pan nut or bung for a container of liquid. The self-attaching female fastener element of this invention may also be formed by cold header techniques, but provides improved retention of the female fastener element in a panel and sufficient torque resistance in a panel, particularly including relatively thin metal panels such as used by the automotive and appliance industries. The general configuration of the self-attaching female fastener of this invention includes an annular central pilot portion having a bore extending through an annular end face of the pilot portion, an annular flange portion surrounding the pilot portion having a generally planar annular bearing face which is preferably parallel to, but spaced below the plane of the end face of the pilot portion. Where the self-attaching female fastener element of this invention is used as a pierce nut, the end face of the pilot portion is also planar. The self-attaching female fastener element also includes an annular groove in the bearing face of the flange portion surrounding the pilot portion including an annular groove bottom wall, a groove inner side wall adjacent the pilot portion and an outer groove wall inclined from the annular groove bottom wall toward the pilot portion defining a restricted opening to the annular groove adjacent the bearing face of the flange portion. In a preferred embodiment, the groove inner side wall is also inclined from the groove bottom wall toward the flange portion providing improved push-off strength for the fastener and panel assembly.

The bottom wall of the annular groove of the self-attaching female fastener element of this invention includes a plurality of circumferentially spaced wedge-shaped recesses extending generally radially, preferably from the inner groove wall to the outer groove wall, each having a bottom wall spaced below the plane of the annular groove bottom wall and opposed linear side walls, preferably extending generally perpendicular to the annular groove bottom wall, wherein the recess side walls diverge outwardly from the inner groove side wall to the outer groove side wall forming the wedge-shaped recesses, wherein the recesses are narrower adjacent the pilot portion than adjacent the annular flange portion. Where the circumferentially spaced wedge-shaped recesses extend from the inner side wall to the outer side wall of the groove, the bottom wall is thus segmented by the wedge-shaped recesses. In a preferred embodiment, the recess side walls are defined by parallel lines tangent to a circle generated from the nut bore, wherein the segmented groove bottom wall is defined by parallel recess side walls of adjacent recesses and the recesses are wedge-shaped. In the disclosed embodiment, the bottom wall of the recesses is planar and spaced below the planar surface or surfaces of the bottom wall of the groove which is also planar.

The method of attaching a female fastener element to a panel of this invention, wherein the female fastener element is utilized as a self-piercing female fastener or pierce nut, includes driving the planar end face of the pilot portion against a metal panel, thereby piercing an opening through the metal panel and receiving the pilot portion through the panel opening, then driving an annular portion of the panel surrounding the opening against the annular groove bottom wall and against the recess bottom walls, deforming the panel portion radially beneath the inclined inner and outer side walls of the annular groove and against the recess bottom walls, wherein the panel portion is received beneath the inclined inner and outer groove side walls and against the recess side walls forming a secure installation. In a preferred method of attaching a self-piercing female fastener element to a panel, wherein the joint formed between the female fastener element and the panel is sealed, the method further includes deforming an outer portion of the end face of the pilot portion radially outwardly and axially against the annular panel portion received in the annular groove, sealing the assembly. In the disclosed embodiment, the female fastener element is attached to a panel with a die member or die button having an annular lip and a cylindrical opening which receives the slug pierced from the panel. In the disclosed method of assembly, the cylindrical opening through the die button has an internal diameter less than the external diameter of the pilot portion, such that an annular external portion of the pilot portion is deformed radially and axially forming an annular bead which is deformed against the panel portion in the annular groove, entrapping and compacting the annular portion of the panel in the groove, thereby sealing the assembly and providing improved torque resistance and push-off strength.

Other advantages and meritorious features of the self-attaching female fastener element, sealed fastener and panel assembly and method of this invention will be more fully understood from the description of the preferred embodiments, the appended claims and the drawings, a brief description of which follows.

DETAILED DESCRIPTION OF THE PREFERRED EMBODIMENTS

As set forth above, the self-attaching female fastener element of this invention may be utilized as a self-piercing female fastener or pierce nut wherein the female fastener element pierces an opening in a metal panel and is attached in one stroke of a die press. Alternatively, the self-attaching female fastener may be utilized as a clinch nut, wherein the clinch nut is installed in a prepierced panel opening. The preferred embodiments of the self-attaching female fastener element of this invention may also be formed by conventional cold heading techniques, but provides superior joint integrity, particularly in thin metal applications and may be used to provide a sealed nut and panel assembly by the method of this invention illustrated in FIG. 5 discussed below.

Figure 1:
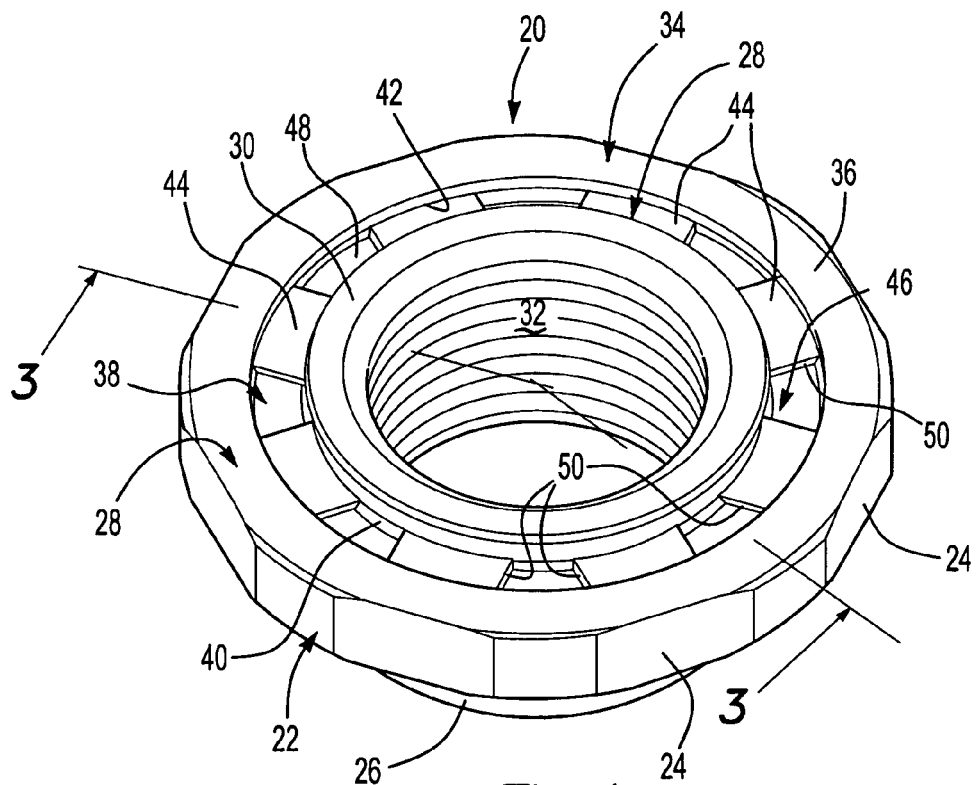
FIG. 1 is a top perspective view of an embodiment of the self-attaching female fastener element of this invention.
Figure 3:
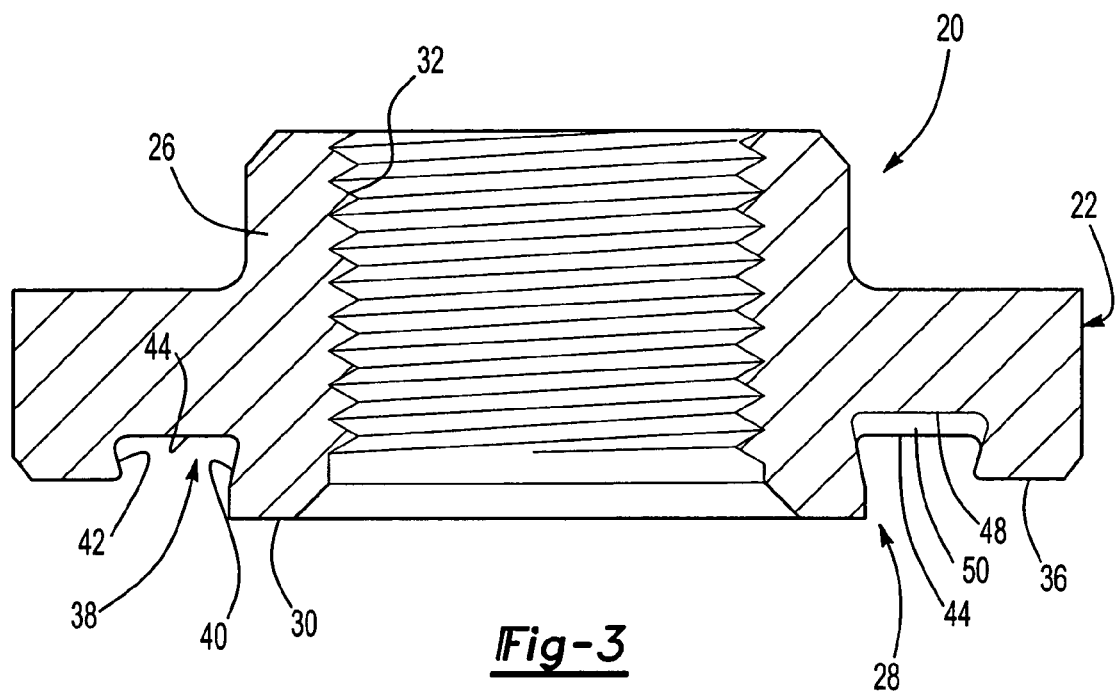
FIG. 3 is a cross-section of FIG. 1 in the direction of view arrows 3—3.
Figure 4:
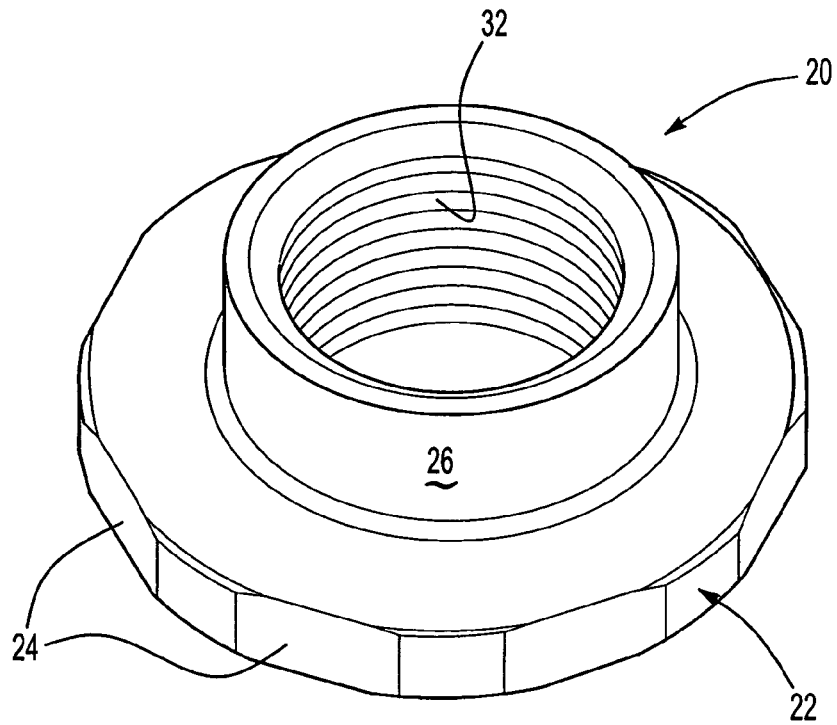
FIG. 4 is a bottom perspective view of the self-attaching female fastener element shown in FIGS. 1 to 3.

The embodiment of the self-attaching female fastener element 20 illustrated in FIG. 1, for example, includes a generally cylindrical body 22 having spaced flats 24 and a tubular barrel portion 26 best illustrated in FIG. 4. The self-attaching female fastener element further includes a central annular pilot portion 28 having an annular end face 30 and a cylindrical bore 32 which is preferably threaded, as shown. Alternatively, the bore may be unthreaded for receipt of a thread forming or thread rolling male fastener or plug as described below in regard to applications of the self-attaching female fastener of this invention. The female fastener element 20 further includes an annular flange portion 34 surrounding the pilot portion 28 having a planar annular bearing face 36. Where the self-attaching female fastener element 20 of this invention is utilized as a pierce nut, the annular end face 30 of the pilot portion is preferably planar and the annular bearing face 36 and may be spaced below the plane of the end face 30 as best shown in FIG. 3 or the planar surfaces may be coplanar. An annular groove 38 is defined in the bearing face 36 of the flange portion 34 which includes an inner groove side wall 40 adjacent the pilot portion 28, which may also form an outer wall of the pilot portion, an outer groove side wall 42 and a bottom groove wall 44. In a preferred embodiment of the invention, the outer groove side wall 42 is inclined inwardly from the bottom wall 44 toward the pilot portion 28 as best shown in FIG. 3 and the inner groove side wall 40 is inclined outwardly from the bottom groove wall 44 toward the flange portion as also shown in FIG. 3. Although in a preferred embodiment, both the inner and outer groove side walls are inclined as shown in FIG. 3 to improve retention of the female fastener element 20 on a panel, the inner groove side wall 40 may also be cylindrical. The inclined inner and outer side walls 40 and 42 form a restricted opening of the annular groove 38, sometimes referred to as a "re-entrant groove" by those skilled in this art.

Figure 2:
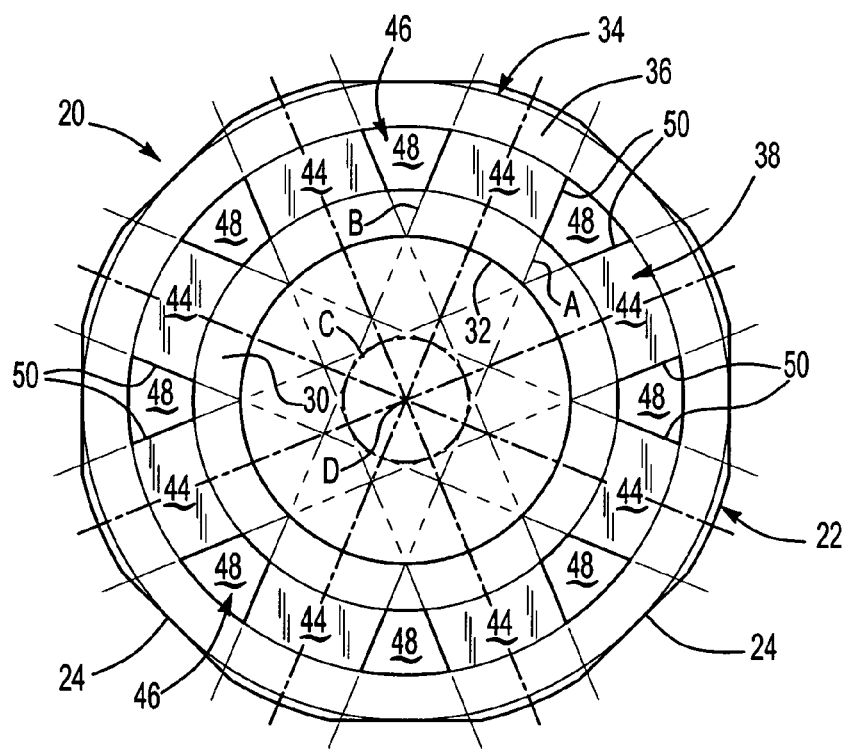
FIG. 2 is a top view of the self-attaching female fastener element shown in FIG. 1 with an overlay of the geometry of the bottom wall of the groove.

In the preferred embodiment of the self-attaching female fastener element 20 of this invention, the bottom groove wall 44 includes a plurality of wedge-shaped circumferentially spaced recesses 46 as shown in FIGS. 1 and 2. The wedge-shaped recesses 46 each include a recess bottom wall 48 and opposed recess side walls 50. The recess side walls 50 diverge outwardly, such that the wedge-shaped recesses 46 are narrower adjacent the pilot portion 28 than adjacent the flange portion 34. In a preferred embodiment, the bottom wall 48 of the wedge-shaped recesses 46 are planar and spaced below the plane of the bottom groove wall 44. Where the recesses 46 extend from the inner groove side wall 40 to the outer groove side wall 42, as shown, the circumferentially spaced wedge-shaped recesses 46 thus interrupt the bottom groove wall 44 forming circumferentially spaced segments. An alternative explanation is that the groove includes a plurality of spaced bottom groove walls 48 between adjacent wedge-shaped circumferentially spaced recesses 46.

As shown in FIGS. 1 and 2, the bottom groove wall segments 44 between adjacent wedge-shaped recesses 46 are generally rectangular except for the arcuate inner and outer portions which join the inner groove side wall 40 and the outer groove side wall 42. The geometry of the generally rectangular bottom groove wall segments 44 and the wedge-shaped recesses 46 is explained in FIG. 2. As shown in FIG. 2, the segments of the bottom groove wall 44 between the wedge-shaped recesses 46 are defined by parallel lines A and B tangent to a circle C generated from the axis D of the bore 32 through the end face 30 of the pilot portion 28. As shown in FIG. 2, the parallel lines A and B are coincident with the recess side walls 50 of adjacent wedge-shaped recesses 46, such that the segments of the bottom groove wall 44 are defined by parallel lines defined by the side walls 50 of adjacent wedge-shaped recesses 46 and the recess side walls 50 of the circumferentially spaced recesses 46 diverge outwardly forming wedge-shaped recesses 46 between the generally rectangular bottom wall segments 44. As will be understood, however, the bottom groove wall segments 44 are actually segments of an annulus having arcuate inner and outer side walls. In the most preferred embodiment, the planar bottom groove wall segments 44 and the wedge-shaped circumferentially spaced recesses 46 are planar, such that the recess bottom walls 48 are parallel to the segments of the bottom groove wall 44 but spaced below the plane of the segments of the bottom groove wall 44 as shown.

Figure 5:
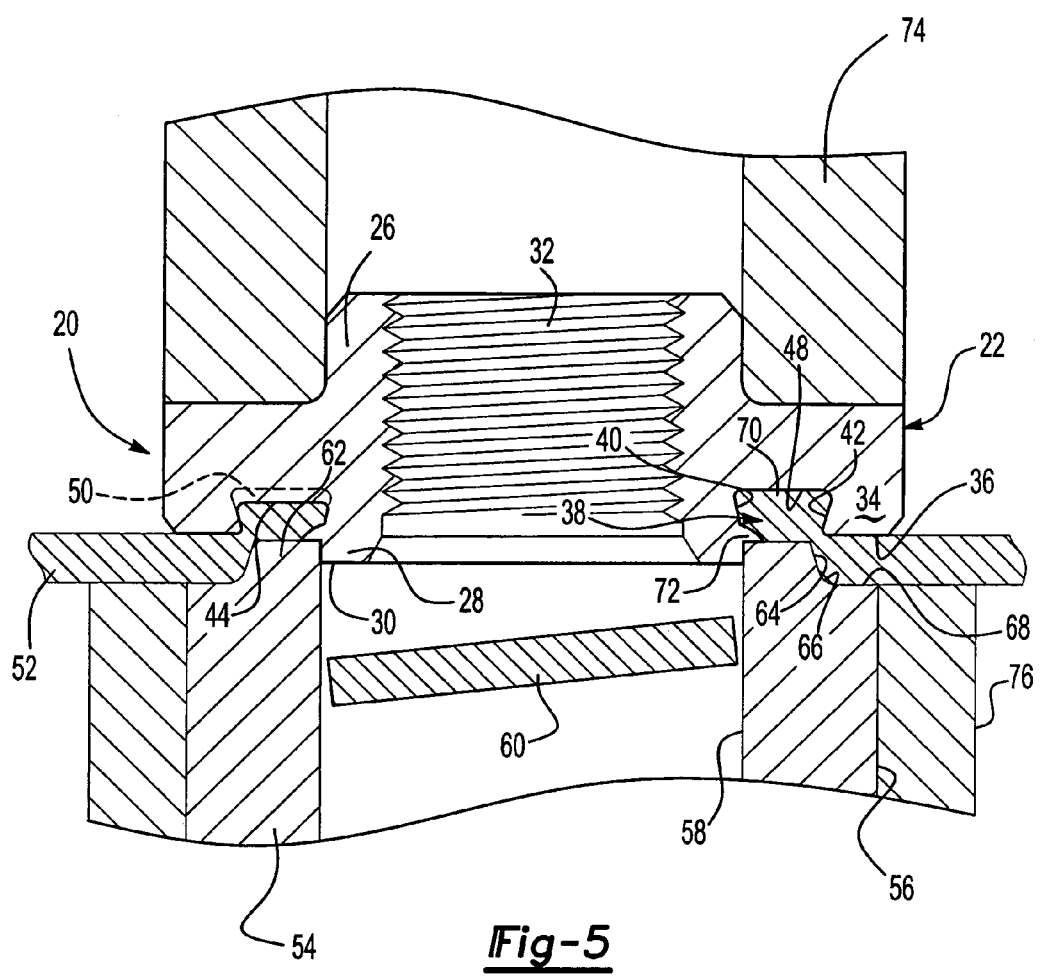
FIG. 5 is a cross-sectional view, similar to FIG. 3 of the self-attaching fastener of this invention during installation in a panel illustrating the method of attaching a self-attaching piercing nut of this invention.

FIG. 5 illustrates the method of installation or method of attaching the self-attaching female fastener element 20 illustrated in FIGS. 1 to 4, wherein the female fastener element 20 is utilized as a pierce nut. As set forth above, the self-attaching female fastener element 20 may also be used as a clinch nut, wherein the panel metal is pierced prior to attachment. The female fastener element 20 is cross-sectioned in FIG. 5 the same as FIG. 3.

As set forth above, the female fastener element 20 may be attached to a metal panel 52 to form a sealed joint with the panel as shown in FIG. 5. The female fastener element 20 is installed in a panel 52 by a die member 54 commonly referred to as a "die button." The die button 54 is normally attached to a lower die shoe or die platen of a press (not shown) and the female fastener element 20 is received in an installation head (not shown) in the upper die shoe (not shown). However, as will be understood by those skilled in this art, the orientation of the die button 54 and the self-attaching female fastener element 20 can be reversed. The die button 54 generally includes a cylindrical body portion 56 having a cylindrical opening 58 which receives the panel slug 60. The die button further includes an annular lip 62 having an inclined or frustoconical outer surface 64 and a radius 66 which joins the inclined outer surface 64 with the end face 68 of the die button. The panel 52 is pierced between the leading edge of the opening 58 through the die button 54 and the end face 30 of the pilot portion 28. The annular lip 62 then deforms an annular panel portion 70 surrounding the pierce panel opening into the annular groove 38 in the bearing face 36 of the flange portion 34, as shown. In a preferred embodiment, wherein the self-attaching female fastener element 20 forms a sealed joint with the panel 52, the internal diameter of the cylindrical opening 58 is less than the external diameter of the pilot portion 28, such that the inclined inner wall 40 of the annular groove 38 is inelastically and permanently deformed radially outwardly and axially as shown in FIG. 5, forming an integral annular bead or lip 72 which entraps the annular panel portion 70 in the annular groove 38 and compacts the panel portion 70 beneath the inclined inner and outer side walls 40 and 42 as shown in FIG. 5 forming a sealed joint between the female fastener element 20 and the panel 52. During the installation, the panel portion 70 is also deformed against the bottom groove wall segments 44 and the recessed bottom walls 48, substantially filling the wedge-shaped recesses 46 in contact with the recess side walls 50.

The female fastener element 20 and panel assembly illustrated in FIG. 5 thus provides a secure sealed female fastener element and panel assembly which may be used for many applications including, for example, an oil pan nut or bung for a container containing a liquid requiring a sealed joint between the female fastener element and a panel. The wedge-shaped circumferentially spaced recesses 46 prevent rotation of the fastener element 20 on the panel 52, particularly when the annular panel portion 70 is compacted into the annular groove 38 against the recess bottom and side walls 48 and 50 by the integral annular bead 72 and the bead 72 entraps the panel portion 70 and assures full contact with the inclined inner and outer side walls 40 and 42 of the annular groove 38 providing superior push-off strength. The barrel portion 26 increases the length of the threaded bore 32. In a preferred embodiment, the barrel portion 26 has a diameter substantially less than the diameter of the flange portion 34 to reduce the overall weight of the female fastener element and provides a bearing surface. As will be understood by those skilled in this art, the installation head (not shown) normally attached to the upper die shoe of a die press (not shown) generally includes a plunger 74 which drives the female fastener element 20 into the panel 52 and the die button 54 is retained in a fixture 76 in the lower die shoe as described above.

As will be understood by those skilled in this art, various modifications may be made to the self-attaching female fastener element 20, the method of attaching the female fastener element and the fastener element and panel assembly of this invention with the purview of the appended claims. For example, the female fastener element 20 may be utilized in various applications requiring a female fastener in a panel and is not limited to the sealed fastener and panel assembly illustrated in FIG. 5, wherein the die button 54 deforms the pilot portion 28, forming the integral radial bead or lip 72, although this is a preferred installation for a sealed female fastener and panel assembly and provides improved integrity for the joint. Further, although a preferred embodiment of the fastener element 20 includes an inclined inner side wall 40 of the annular groove 38, the side wall 40 may also be cylindrical. The flats 24 on the cylindrical body 22 assist retention of the fastener element during threading of the bore 32 but are not required, particularly when the bore 32 is unthreaded, as described above. Having described preferred embodiments of the female fastener element, panel assembly and method of this invention, the invention is now claimed as follows.

What is claimed is:

1. A self-attaching female fastener element for attachment to a metal panel, comprising:
    an annular pilot portion having a bore extending through an annular end face of said pilot portion;
    an annular flange portion surrounding said pilot portion having a planar annular bearing face generally parallel to a plane of said end face of said pilot portion;
    an annular groove in said annular bearing face of said flange portion surrounding said pilot portion including an annular groove bottom wall, a groove inner side wall adjacent said pilot portion and an outer groove wall;
    said annular groove bottom wall including a plurality of circumferentially spaced generally wedge-shaped recesses extending from adjacent said groove outer side wall to adjacent said groove inner side wall defining radial segments of said groove bottom wall therebetween, each radial segment having a top face integral with said outer groove wall and radial side walls extending from said groove bottom wall to a bottom wall of said recesses; and
    said groove outer side wall inclined inwardly at an acute angle from said groove bottom wall toward said pilot portion overlying said top face of said radial segments integral with said groove outer side wall, whereby said metal panel deformed against said top faces of said radial segments is deformed radially outwardly beneath said inclined groove outer side wall.

2. The self-attaching female fastener element as defined in claim 1, wherein said bottom wall of said recesses is planar between said radial segments.

3. The self-attaching female fastener element as defined in claim 2, wherein said planar bottom wall of said recesses is parallel to said planar annular bearing face of said annular flange portion.

4. The self-attaching female fastener element as defined in claim 1, wherein said groove outer side wall is frustoconical having a continuous frustoconical surface.

5. The self-attaching female fastener element as defined in claim 1, wherein said radial segments of said radial groove bottom wall have a circumferential width greater than a circumferential width of said recesses.

6. A self-attaching female fastener element for attachment to a metal panel, comprising:
- an annular pilot portion having a bore extending through an annular end face of said pilot portion;
- an annular flange portion surrounding said pilot portion having a planar annular bearing face generally parallel to a plane of said end face of said pilot portion;
- an annular groove in said planar annular bearing face of said flange portion surrounding said pilot portion, including an annular groove bottom wall, a groove inner side wall adjacent said pilot portion and a groove outer side wall;
- said annular groove bottom wall including a plurality of circumferentially spaced generally wedge-shaped recesses extending from adjacent to said groove outer side wall to adjacent said groove inner side wall including a planar recess bottom wall extending parallel to said planar annular bearing face of said flange portion;
- said recesses defining radial segments of said groove bottom wall therebetween each having a top face integral with said groove outer side wall and radial side walls extending from said planar recess bottom wall to said groove bottom wall; and
- said groove outer side wall inclined inwardly at an acute angle from said groove bottom wall toward said pilot portion overlying said top faces of said radial segments of said annular groove bottom wall integral with said groove outer side wall, whereby said metal panel deformed against said top faces of said radial segments integral with said groove outer side wall is deformed radially beneath said inclined groove outer side wall.

7. The self-attaching female fastener element as defined in claim 6, wherein all of said radial segments of said bottom wall of said annular groove are integral with said groove outer side wall.

8. The self-attaching female fastener element as defined in claim 6, wherein said groove outer side wall is frustoconical having a continuous frustoconical surface.

9. The self-attaching female fastener element as defined in claim 6, wherein said radial segments of said annular groove bottom wall have a circumferential width greater than a circumferential width of said recesses.

* * * * *